US012775401B2

(12) United States Patent
Sarkar

(10) Patent No.: US 12,775,401 B2
(45) Date of Patent: Oct. 27, 2026

(54) PROTECTION AGAINST INVALID MEMORY COMMANDS

(71) Applicant: Micron Technology, Inc., Boise, ID (US)

(72) Inventor: Sourin Sarkar, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 122 days.

(21) Appl. No.: 17/834,547

(22) Filed: Jun. 7, 2022

(65) Prior Publication Data

US 2023/0393763 A1 Dec. 7, 2023

Related U.S. Application Data

(60) Provisional application No. 63/347,711, filed on Jun. 1, 2022.

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
None
See application file for complete search history.

(56) References Cited

U.S. PATENT DOCUMENTS 7,155,615 B1 * 12/2006 Silvester ................. G06F 21/80 713/185
7,454,169 B2 * 11/2008 Soerensen ............... G06F 21/73 455/26.1
8,621,238 B1 * 12/2013 Kimball .................. G06F 21/51 712/228
9,152,553 B1 * 10/2015 Shin ...................... G06F 3/0679
2007/0255917 A1 * 11/2007 Toyama ................ G06F 3/0659 711/163
2014/0325239 A1 * 10/2014 Ghose ................. G06F 11/1407 713/190
2015/0254022 A1 * 9/2015 Oikawa ................ G06F 3/0607 711/103
2019/0317676 A1 * 10/2019 Sandoval .............. G06F 3/0622
2020/0117393 A1 * 4/2020 Boehm ................. G06F 3/0673
2020/0174691 A1 * 6/2020 Peterson ................. G06F 3/067

(Continued)

OTHER PUBLICATIONS

Dictionary.com | Meanings & Definitions of English Words. (2020). In Dictionary.com. https://www.dictionary.com/browse/sequence (Year: 2020).*

*Primary Examiner* — Stephanie Wu
(74) *Attorney, Agent, or Firm* — Harrity & Harrity, LLP

(57) ABSTRACT

Implementations described herein relate to protection against invalid memory commands. In some implementations, a memory device may include one or more components that may receive, from a host device, a pilot command that includes an indication of a sequence of upcoming memory commands to be transmitted from the host device to the memory device, receive a memory command from the host device after receiving the pilot command, determine that the memory command is invalid based on the indication of the sequence of upcoming memory commands, and transmit, to the host device and based on determining that the memory command is invalid, a message indicating that the memory command is invalid. Numerous other implementations are described.

25 Claims, 17 Drawing Sheets

(56) References Cited

U.S. PATENT DOCUMENTS

| | | | | |
|---|---|---|---|---|
| 2020/0257460 | A1* | 8/2020 | Som | G06F 3/0673 |
| 2022/0413748 | A1* | 12/2022 | Senoo | G11C 16/20 |
| 2023/0195376 | A1* | 6/2023 | Zilberstein | G06F 3/0659<br>711/103 |

* cited by examiner

PROTECTION AGAINST INVALID MEMORY COMMANDS

CROSS-REFERENCE TO RELATED APPLICATION

This Patent Application claims priority to U.S. Provisional Patent Application No. 63/347,711, filed on Jun. 1, 2022, and entitled "PROTECTION AGAINST INVALID MEMORY COMMANDS." The disclosure of the prior Application is considered part of and is incorporated by reference into this Patent Application.

TECHNICAL FIELD

The present disclosure generally relates to memory devices, memory device operations, and, for example, to protection against invalid memory commands.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
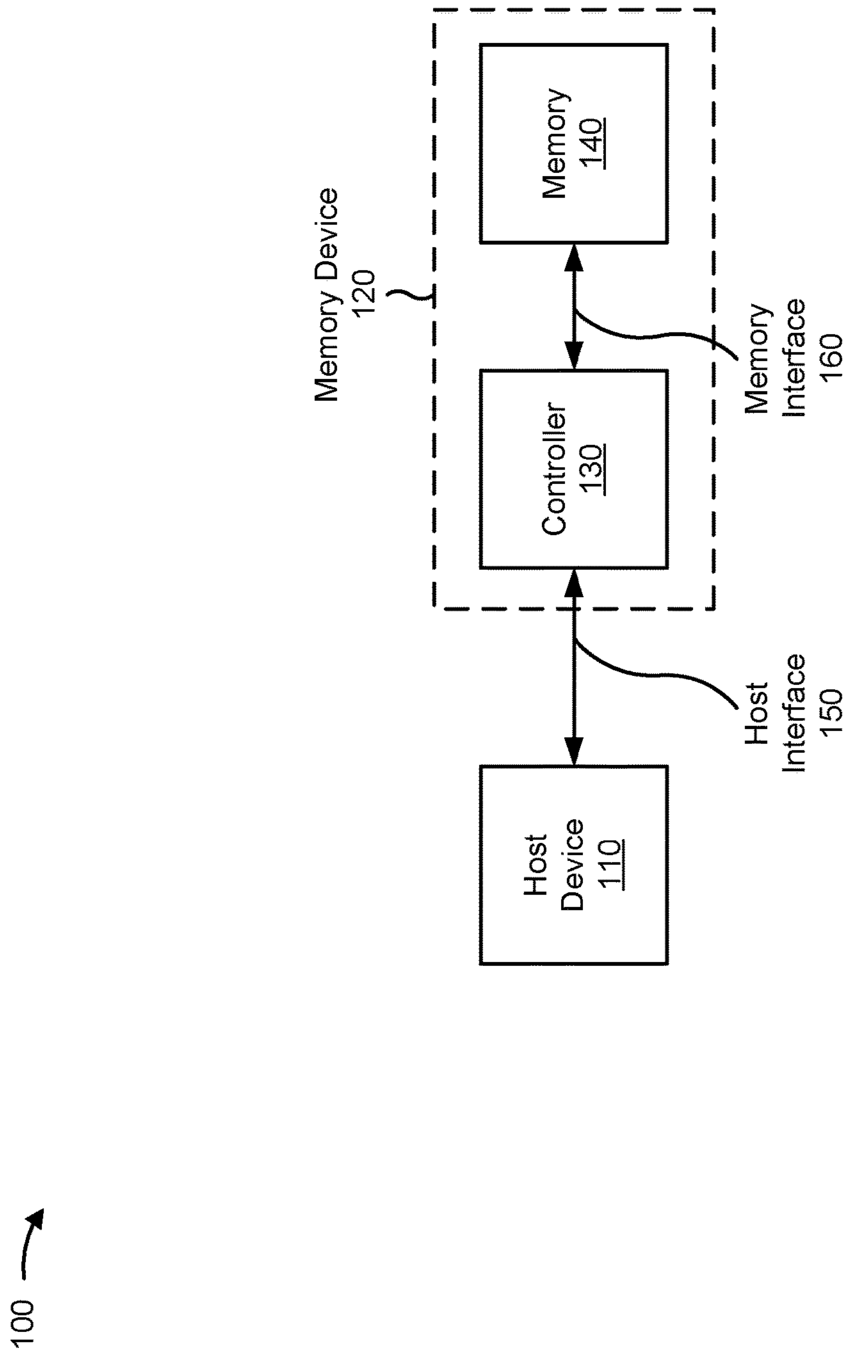
FIG. 1 is a diagram illustrating an example system capable of protection against invalid memory commands.

A host device may interact with a secure memory device by using various secure command and response mechanisms. A secure command and response mechanism may protect against attacks from malicious users by using advanced cryptographic mechanisms implementing symmetric or asymmetric keying methods, among other examples. For example, a host device may interact with a memory device using a Federal Information Processing Standard (FIPS) cryptographic standard, a National Institute of Standards and Technology (NIST) cryptographic standard, or a similar cryptographic standard. Implementing secure command and response mechanisms such as FIPS or NIST based encryption may ensure that communications between the host device and the secure memory device cannot be accessed by a malicious user, or may reduce the likelihood of such malicious access.

In some cases, however, a secure memory device may still be vulnerable to malicious attacks notwithstanding that the secure memory device implements one or more of the above-described cryptographic techniques or similar security measures. For example, certain attacks may not be directed to breaking a cryptography-based protection associated with a secure memory device, stealing a secure key associated with a secure memory device, breaking down public key infrastructure associated with a secure memory device, or the like. Instead, some attacks may be directed to disabling or otherwise overwhelming the secure memory device in order to render the secure memory device inoperable. For example, if the host device becomes under control of a malicious user, the host device may bombard the memory device with commands in an effort to create noise at the secure memory device and/or to put the secure memory device into a continuous error recovery mode by thrashing error processing logic at the memory device. In such instances, the secure memory device may lock up or otherwise become inaccessible to a user, which may be particularly problematic for time-sensitive and/or mission critical applications, such as applications associated with autonomous driving, aircraft control, or the like.

Some implementations described herein enable the use of an indication of a sequence of upcoming memory commands, which enables the memory device to validate memory commands received from the host device in order to identify, and thus ignore, unexpected memory commands that may originate from a malicious user. In some implementations, a pilot command may be used to indicate to a memory device a sequence of commands to be transmitted from the host device to the memory device that are associated with an upcoming memory operation. As the memory device receives memory commands from the host device, the memory device may determine if each incoming command is an expected command, and thus considered a valid memory command, or is an unexpected command, and thus considered an invalid memory command. If the memory command is an unexpected command, the memory device may ignore the command, increment an illegal attempt counter, and/or transmit an error message to the host device. After receiving a threshold number of invalid memory commands, the memory device may reset automatically. As a result, implementations of the disclosure may prevent malicious attacks to a secure memory device by preventing a malicious user from locking up or otherwise rendering a secure memory device inoperable by thrashing error processing logic at the memory device. Implementations of using a sequence of upcoming memory commands by a memory device to validate memory commands received from a host device are described in more detail in connection with the following figures.

FIG. 1 is a diagram illustrating an example system 100 capable of protection against invalid memory commands. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
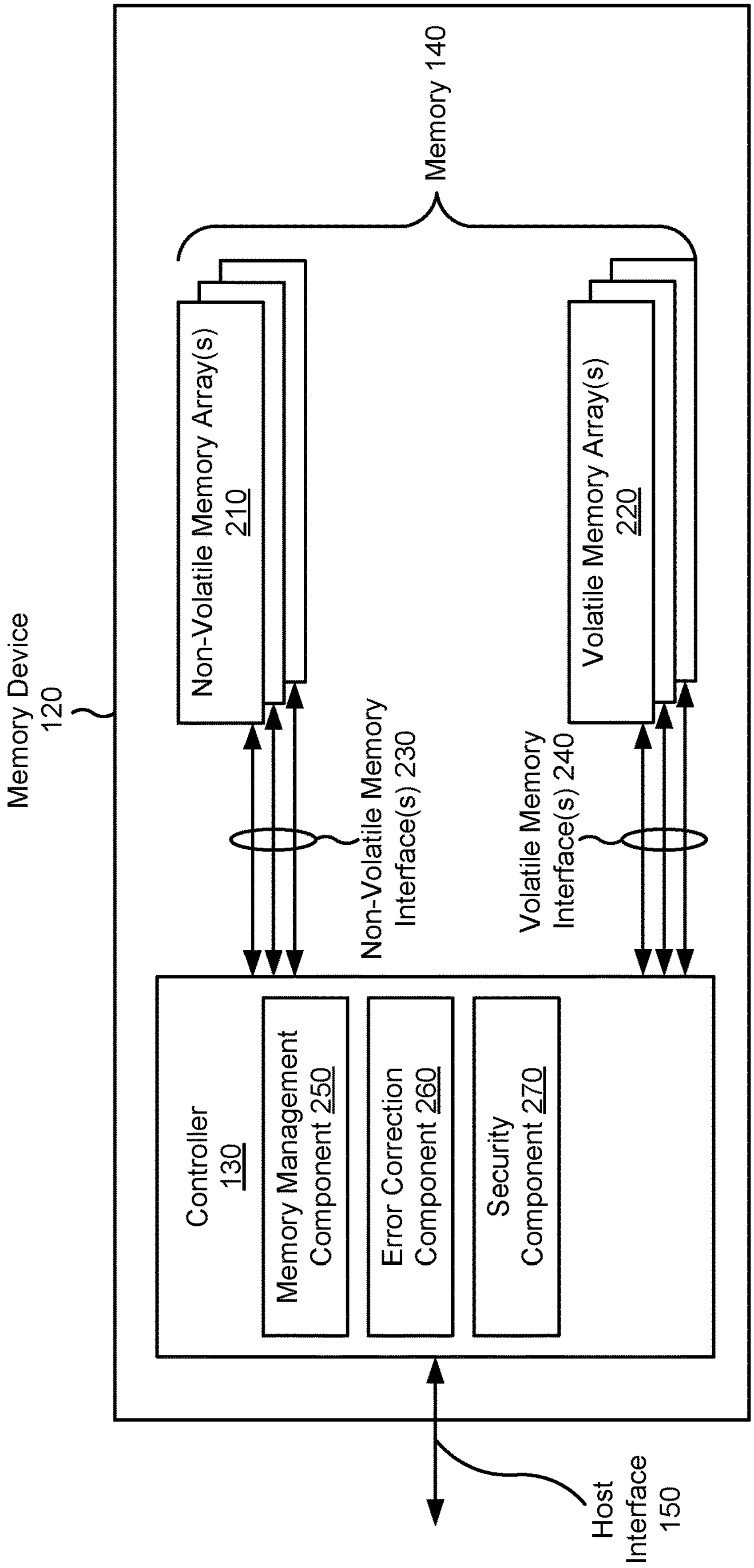
FIG. 2 is a diagram of example components included in a memory device.

FIG. 2 is a diagram of example components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, and/or a security component 270, among other examples. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE).

The security component 270 may be configured to perform one or more security operations for the memory device 120. For example, the security component 270 may be configured to encrypt or decrypt data, such as data read from the memory 140 and/or data to be written to the memory 140. Additionally, or alternatively, the security component 270 may be configured to validate commands received from the host device 110, such as by validating a cryptographic signature of a command (e.g., using one or more cryptographic keys). In some implementations, the security component 270 may be configured to perform one or more security operations for the memory device 120 associated with protecting against out-of-order or otherwise unexpected commands received via the host interface 150. For example, in some implementation, the security component 270 may be associated with a hardware security module (HSM) that performs one or more security operations for the memory device 120, such as encrypting or decrypting data, validating commands received from the host device 110, and/or protecting against out-of-order or otherwise unexpected commands received from the host device 110 and/or via the host interface 150. Implementations of protecting against out-of-order or otherwise unexpected commands are described in more detail in connection with FIGS. 3A-8.

Figure 4A:
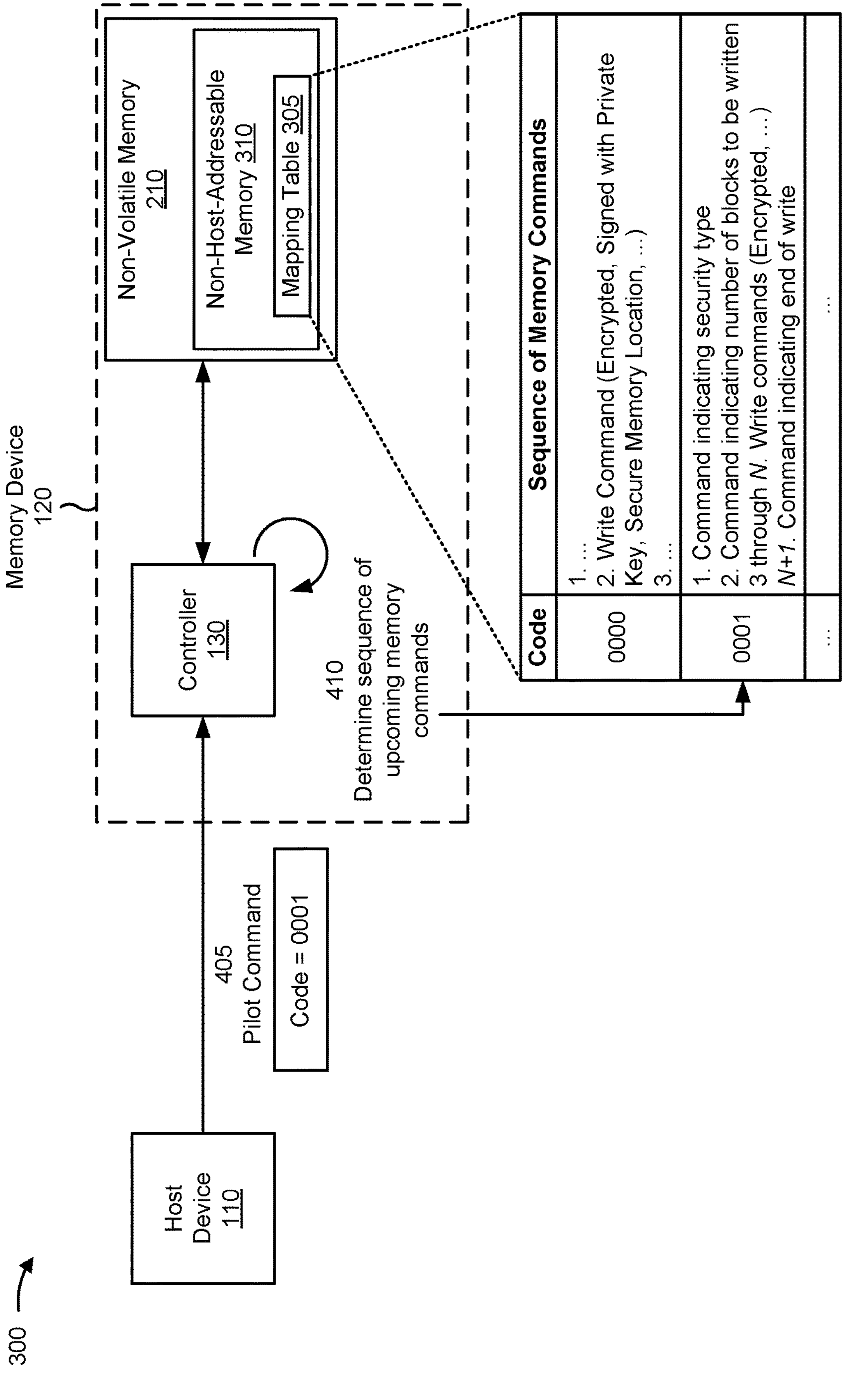
FIGS. 4A-4E are diagrams illustrating another example of protection against invalid memory commands.
Figure 4B:
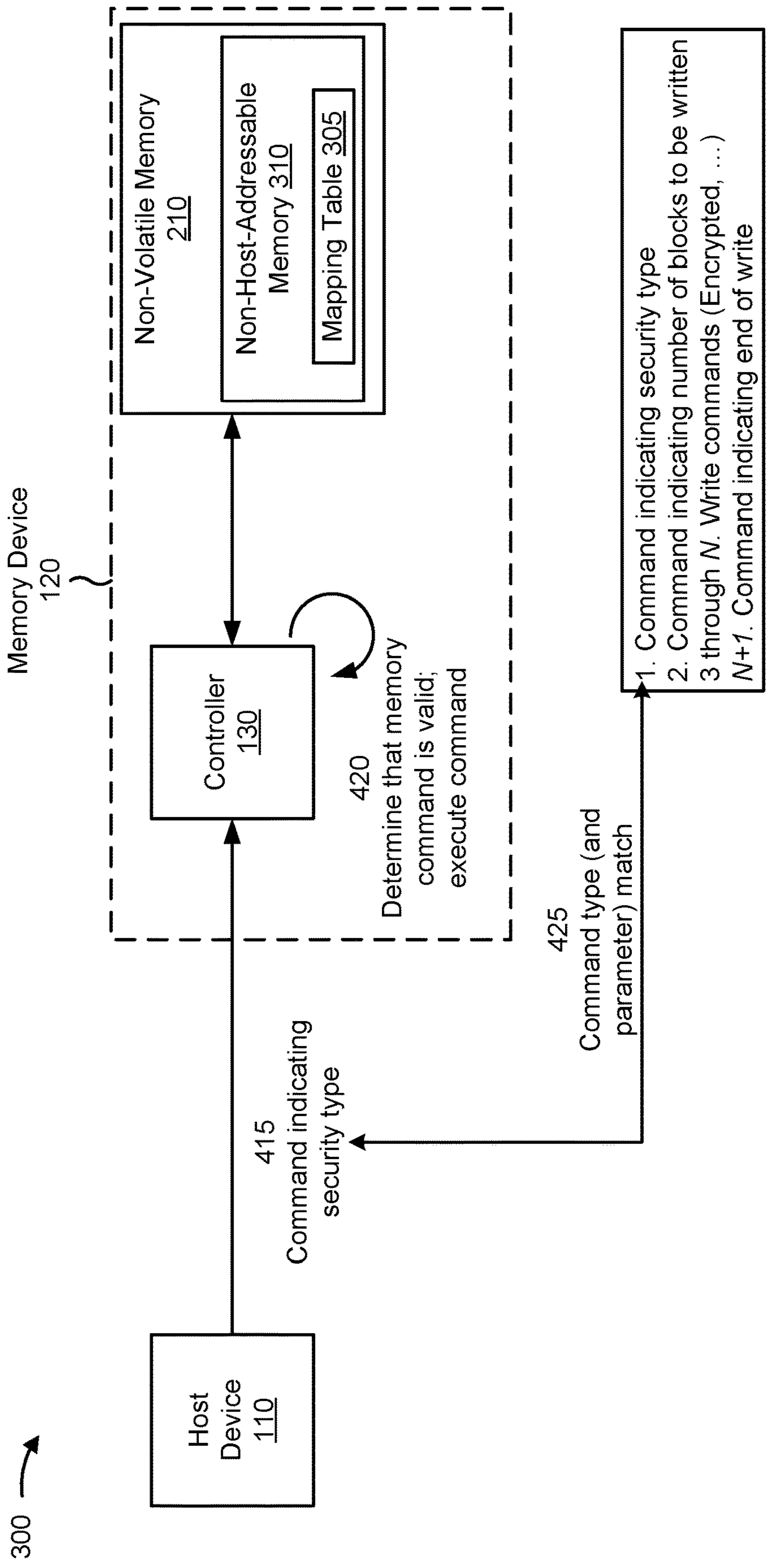
Figure 4C:
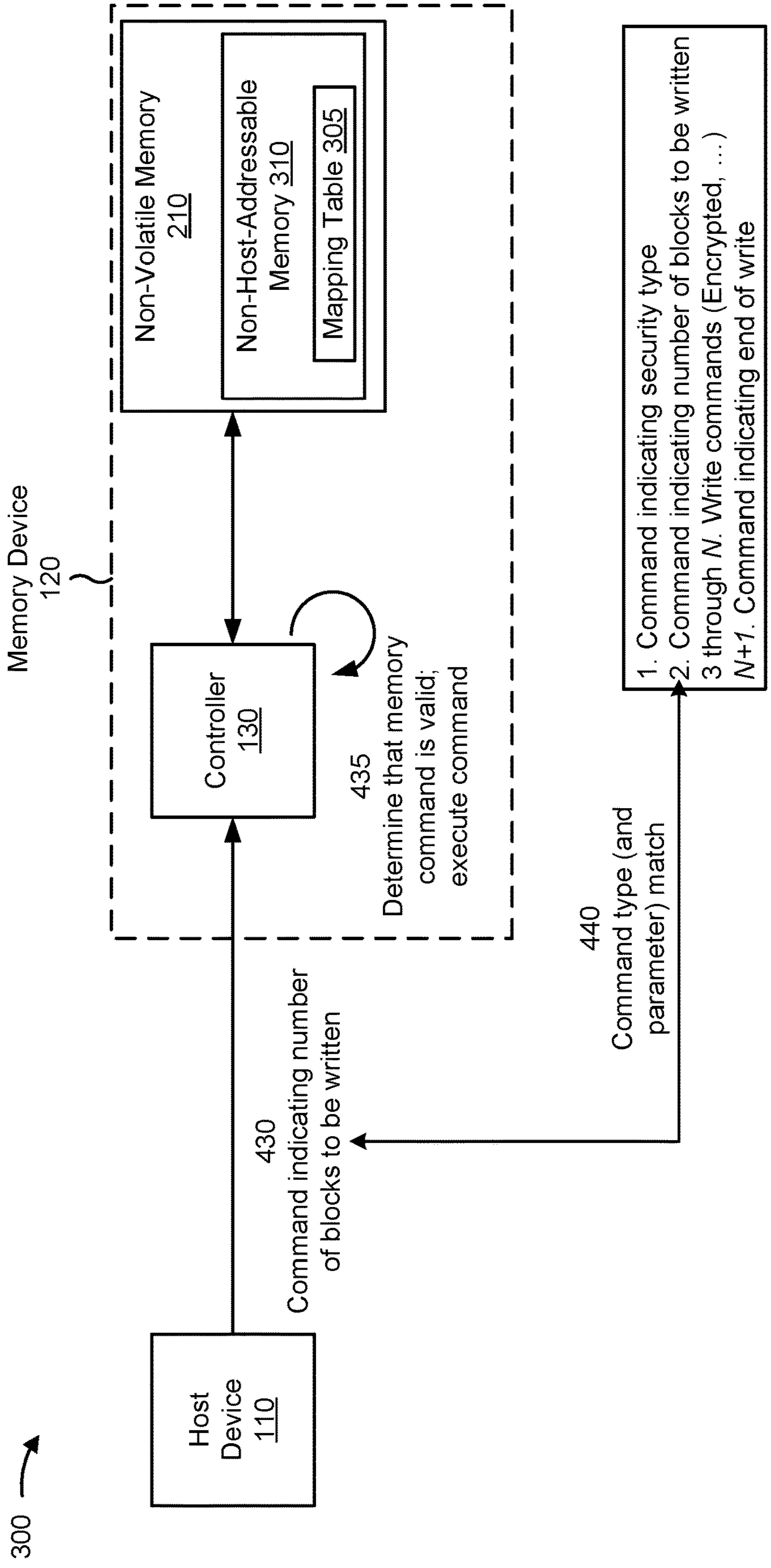
Figure 4D:
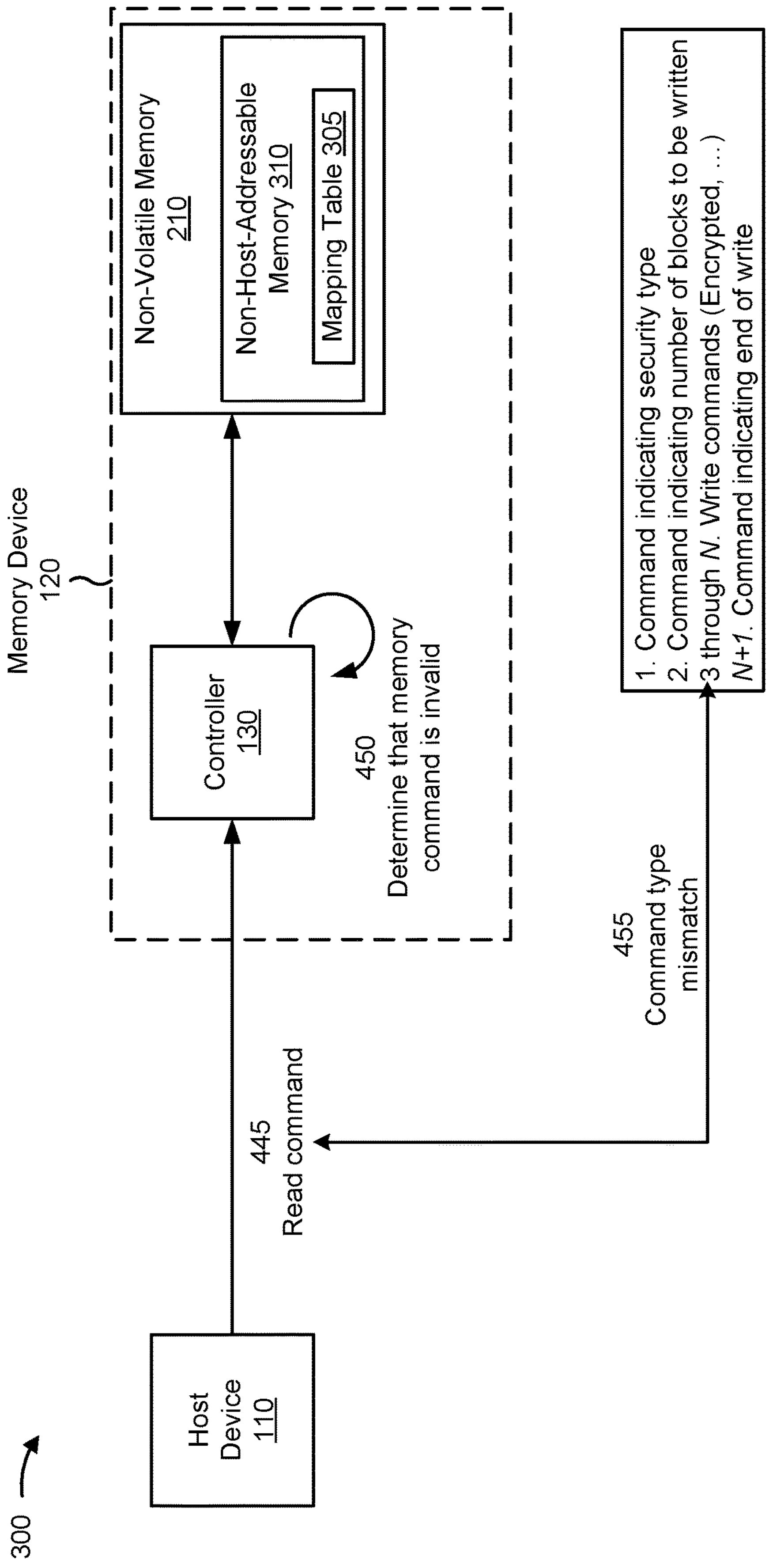
Figure 4E:
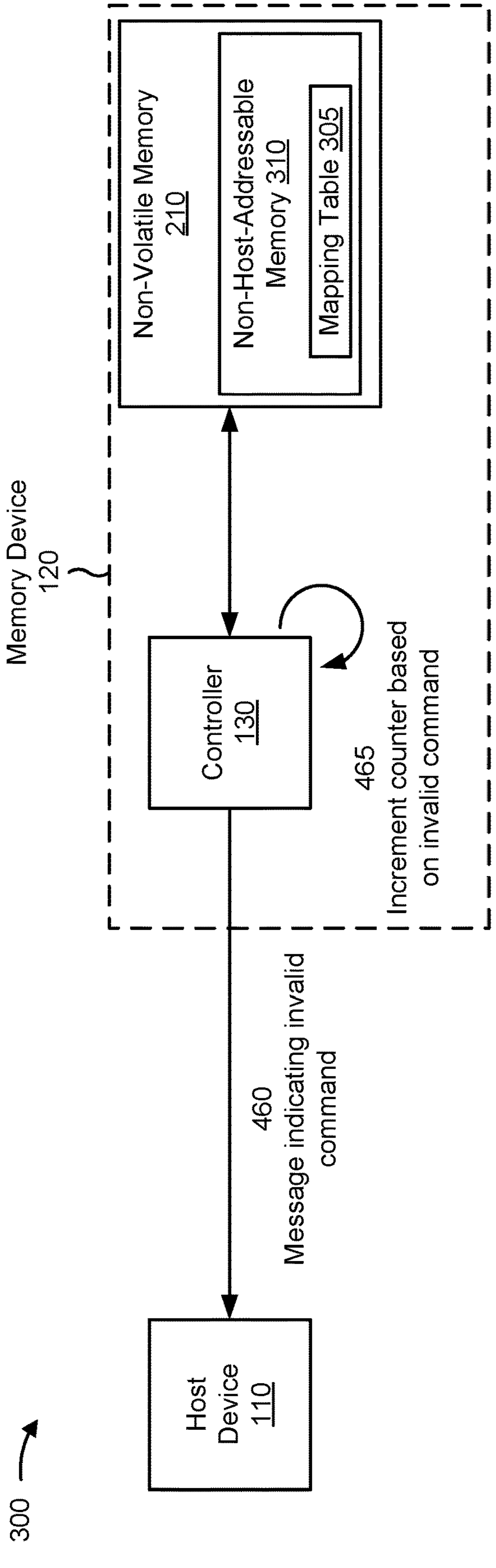
Figure 5A:
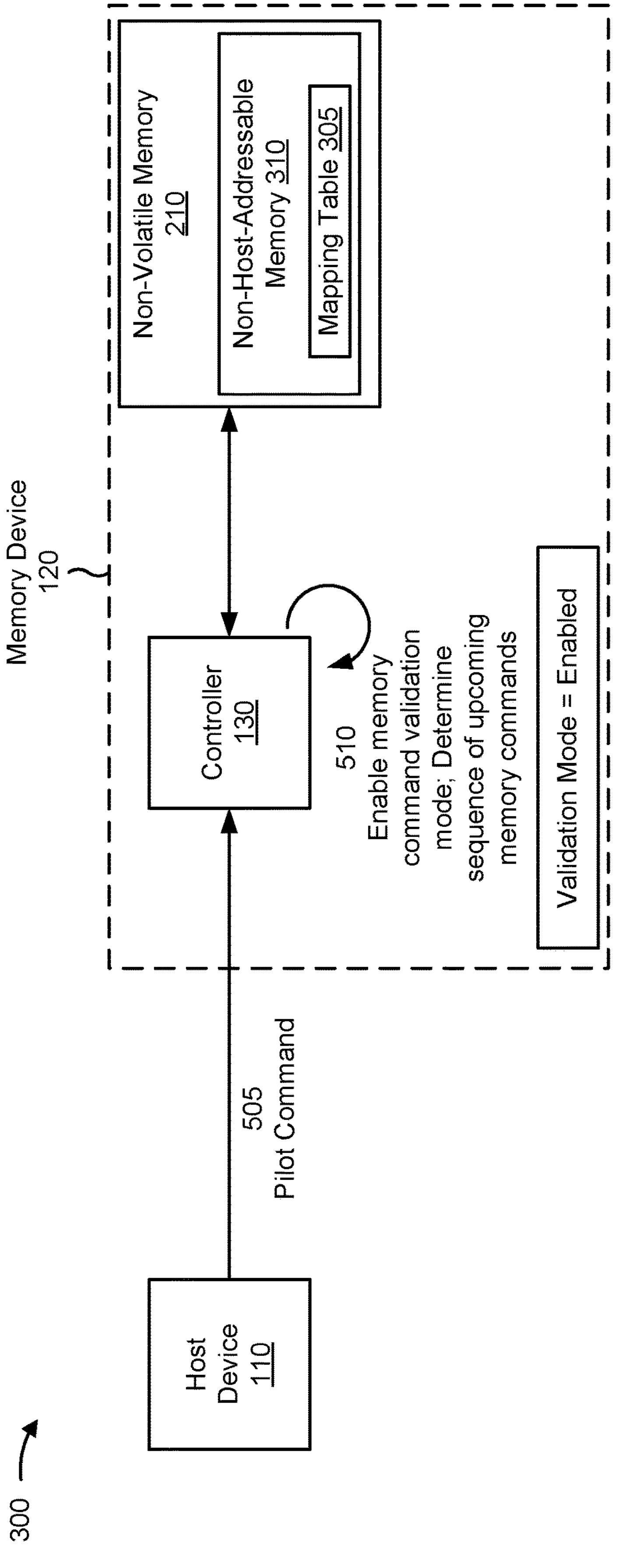
FIGS. 5A-5C are diagrams illustrating another example of protection against invalid memory commands.
Figure 5B:
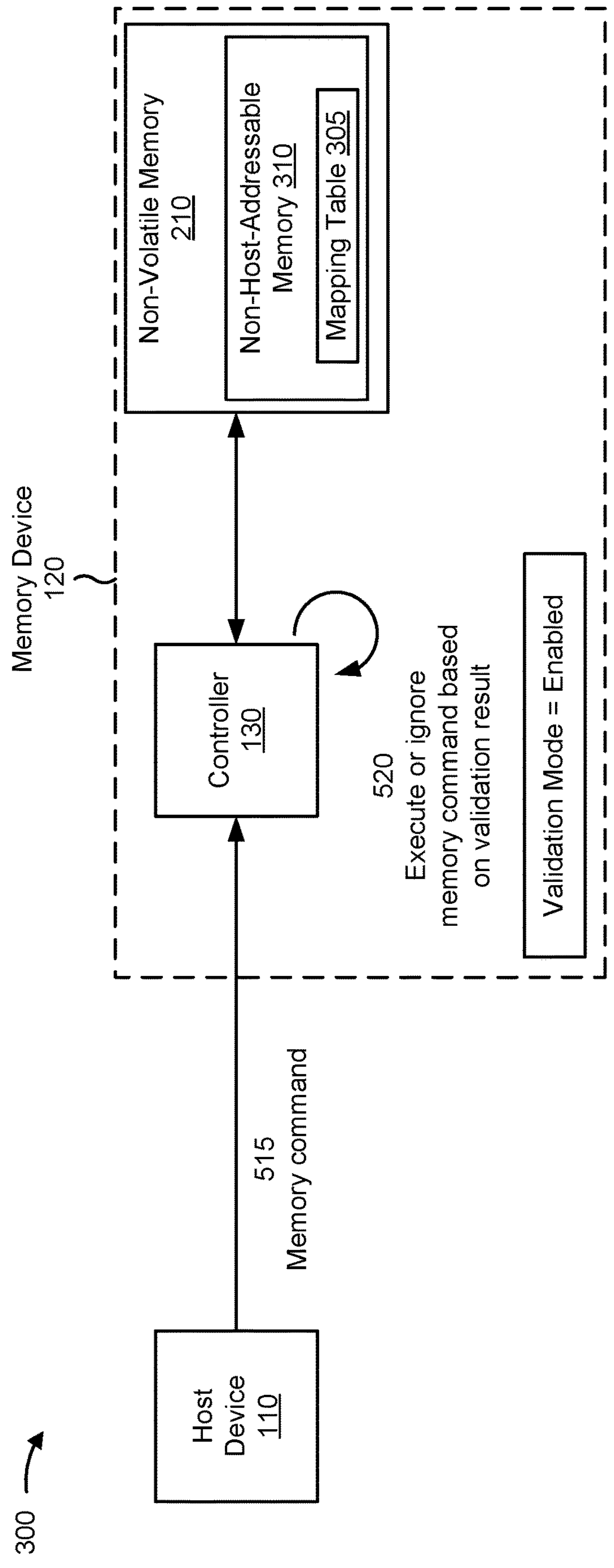
Figure 5C:
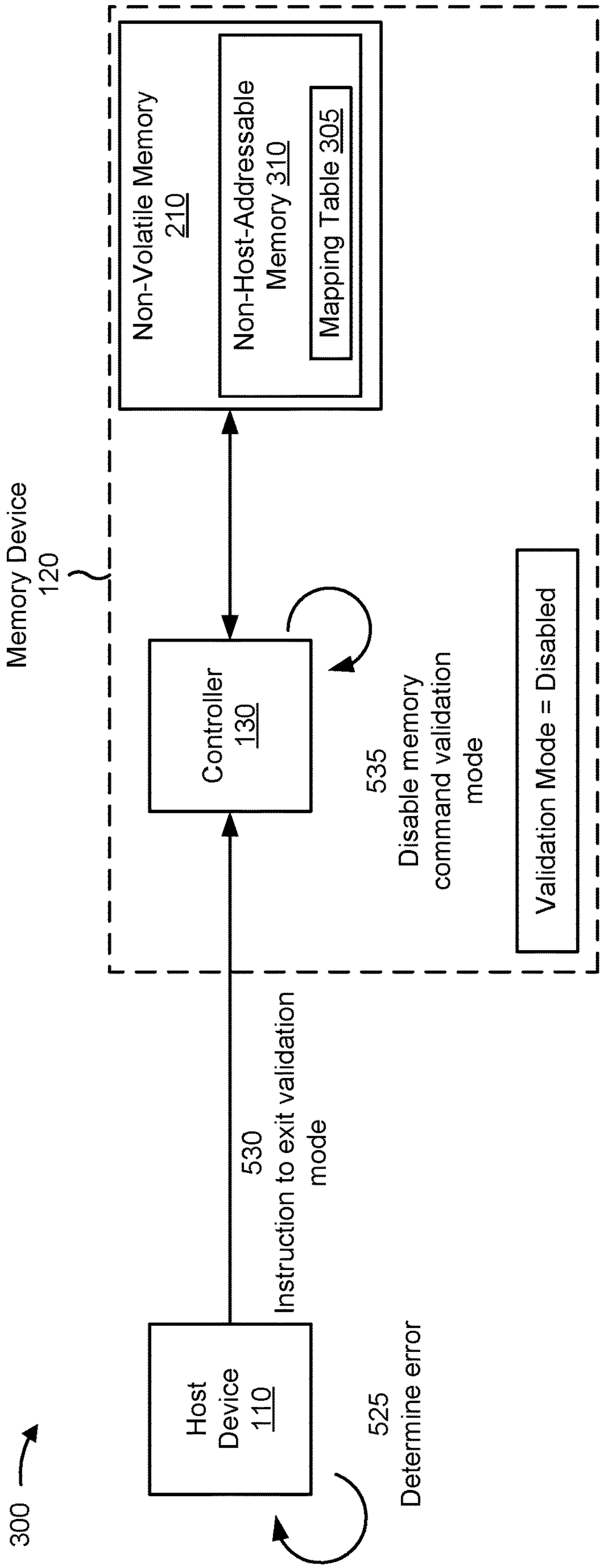
Figure 6:
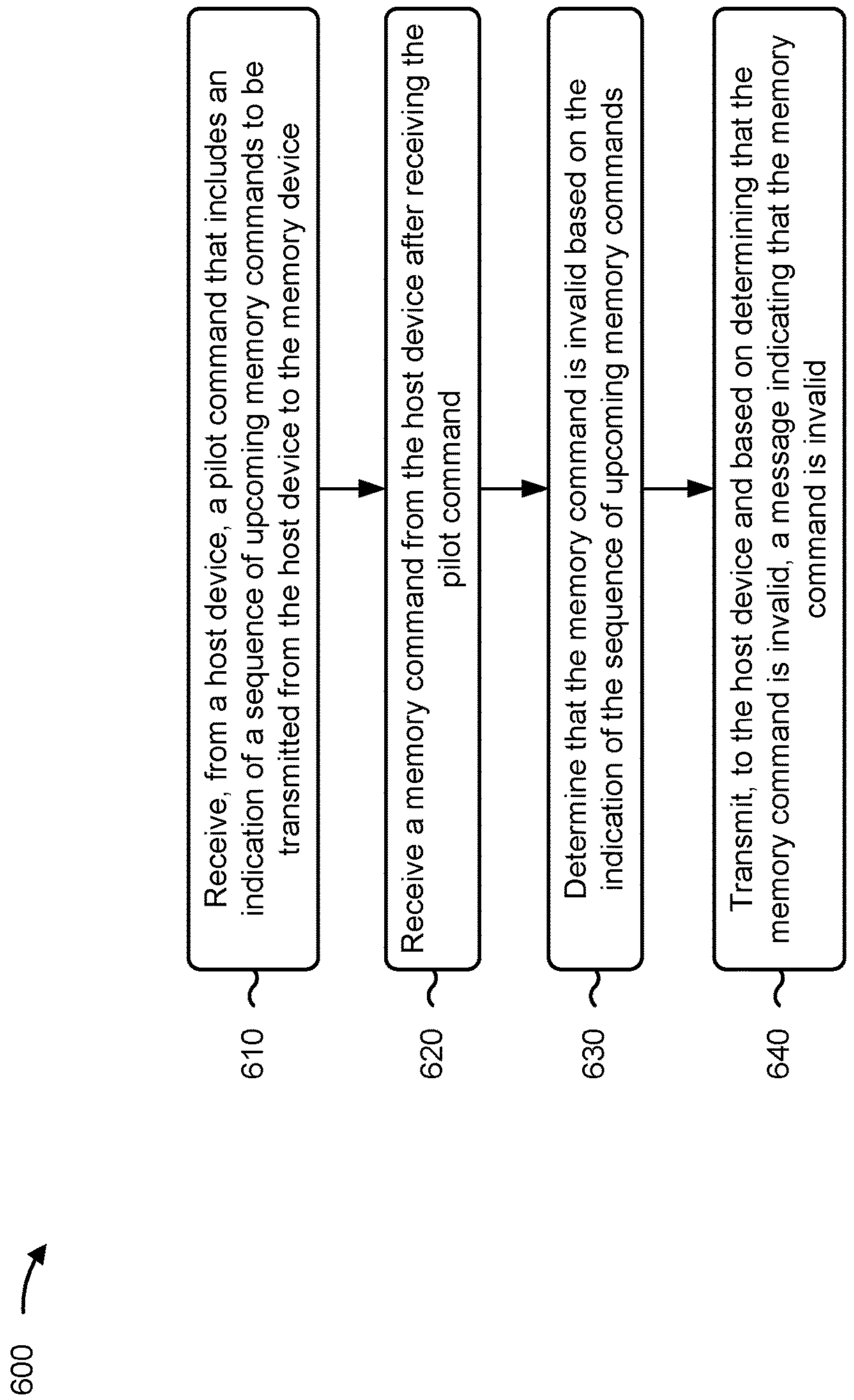
FIG. 6 is a flowchart of an example method associated with protection against invalid memory commands.
Figure 7:
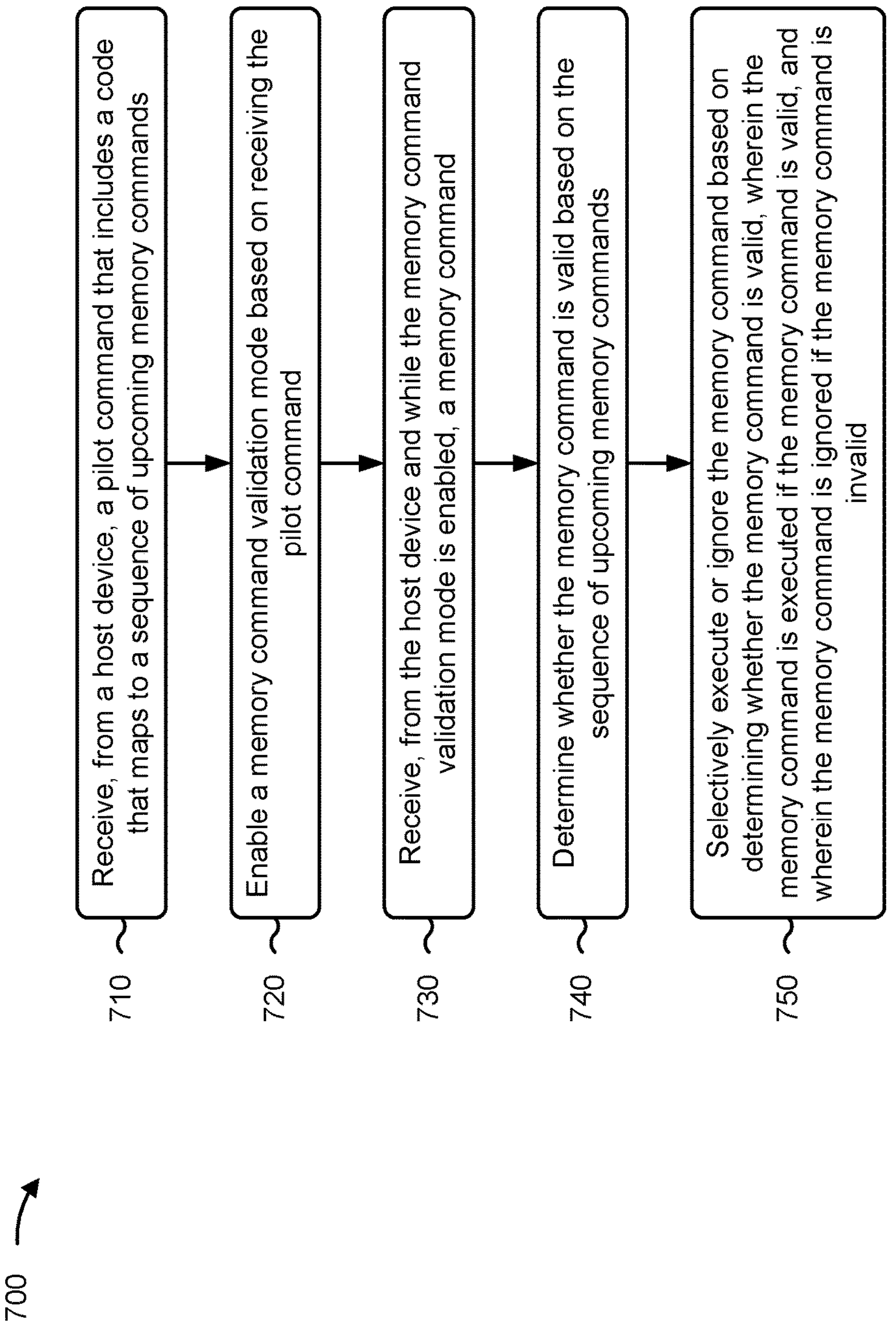
FIG. 7 is a flowchart of another example method associated with protection against invalid memory commands.
Figure 8:
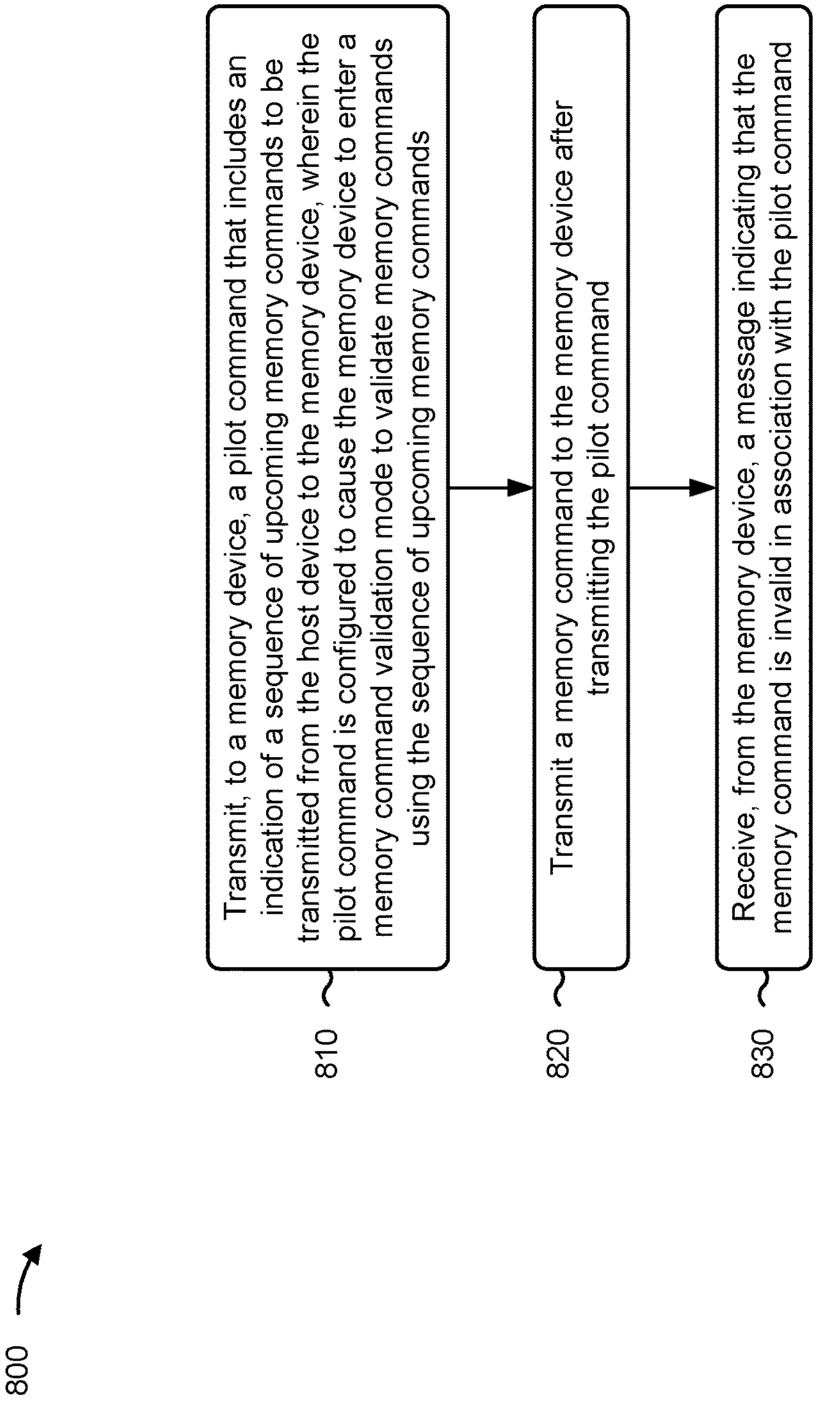
FIG. 8 is a flowchart of another example method associated with protection against invalid memory commands.

One or more devices or components shown in FIG. 2 may be used to carry out operations described elsewhere herein, such as one or more operations of FIGS. 3A-5C and/or one or more process blocks of the methods of FIGS. 6-8. For example, the controller 130 and/or the security component 270 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIGS. 3A-3D are diagrams illustrating an example 300 of protection against invalid memory commands. More particularly, FIGS. 3A-3D illustrate an example in which a memory device 120 or a component thereof (e.g., the controller 130 and/or the security component 270) may determine if a received memory command is valid and thus execute the command, or else is invalid (e.g., received from a malicious user) and thus decline to execute the invalid command.

More particularly, in some implementation, the memory device 120 may include a memory (e.g., memory 140, and, more particularly, one or more of the non-volatile memory arrays 210 associated with the memory 140) configured to store a table (e.g., a mapping table 305) that indicates mappings between codes and corresponding sequences of upcoming memory commands. For example, the one or more components of the memory device 120 (e.g., the memory 140 and/or the non-volatile memory arrays 210) may be configured to store the mapping table 305 in a non-host-addressable memory region 310 of the memory 140. In some implementations, a non-host-addressable memory region 310 may refer to a region of the memory 140 that is not accessible, readable, and/or rewritable by the host device 110 (e.g., a region that is hard-coded at the memory device 120, such as part of the memory device 120 firmware or the like), such that the non-host-addressable memory region 310 may not be altered or otherwise accessed by the host device 110, particularly a host device 110 under malicious control. The mapping table 305 may include multiple entries, each corresponding to a candidate sequence of upcoming memory commands and associated with a corresponding code. For example, in the depicted example, each candidate sequence of upcoming memory commands is associated with a four-bit code (e.g., 0000, 0001, and so forth), but implementations of the disclosure are not so limited. In some other implementations, each candidate sequence of upcoming memory commands stored in the mapping table 305 may be associated with a code having more than four bits or fewer than four bits without departing from the scope of the disclosure. In some implementations, the code may be referred to as an operation code or a transaction code.

Each sequence of upcoming memory commands may be a preconfigured order of commands that may be issued by the host device 110, such as commands to perform certain operations at the memory device 120. For example, a sequence of upcoming memory commands may be associated with a read operation, a write operation, an erase operation, or a memory management operation, and thus may include one or more commands associated with the read operation, the write operation, the erase operation, and/or the memory management operation. In some implementations, the sequence of upcoming memory commands may include one or more commands indicating a security type associated with forthcoming commands, a write command including certain parameters associated with the write command (e.g., whether or not the write command will be encrypted and/or a type of encryption to be used, whether or not the write command will be signed with a private key, whether or not the write command is associated with a secure memory location, and/or similar parameters), a command indicating a number of blocks to be written to the memory 140, a command indicating an end of a write operation, or similar commands.

In some implementations, and as shown by reference number 315, the memory device 120 may receive, from the host device 110 (e.g., via the host interface 150), a pilot command. In some implementations, the pilot command may be a single command (sometimes referred to as an atomic command) transmitted to the memory device 120 in preparation for performing a memory operation (sometimes referred to as an operation context or a transaction context), such as in preparation for performing one of a read operation, a write operation, or a memory management operation, among other examples. An operation context may be a security management command that may be accomplished using a relatively small number of command sequences (as compared to a transaction context), such as for setting up or modifying security parameters of the memory device 120. A transaction context may be a relatively long operation (as compared to an operation context) that uses many commands and/or a variety of commands to accomplish a task. In some implementations, a transaction context may be associated with a large number of operations, such as numerous consecutive write operations and/or numerous consecutive read operations (e.g., an authenticated read session). Moreover, in some implementations, the pilot command may be an authenticated secure command. That is, the pilot command may be a command that is executed within an envelope of a security protocol established between the host device 110 and the memory device 120.

In some implementations, the pilot command may include an indication of a sequence of upcoming memory commands to be transmitted from the host device 110 to the memory device 120. For example, the indication of the sequence of upcoming memory commands to be transmitted from the host device 110 to the memory device 120 may include a code (e.g., a four-bit code in the depicted example) that maps to the sequence of upcoming memory commands stored in the mapping table 305 (e.g., the code may map to a sequence of upcoming memory commands associated with the indicated code in the mapping table 305). As shown by reference number 320, the memory device 120 may determine a sequence of upcoming memory commands based at least in part on the pilot command. More particularly, the one or more components of the memory device 120 may determine the sequence of upcoming memory commands by identifying a mapping between the code indicated by the pilot command and a corresponding sequence of upcoming memory commands stored in the mapping table 305. In the depicted example, the pilot command indicates a code of "0000," and the memory device 120 identifies the sequence of upcoming memory commands associated with "0000" in the mapping table which, in the depicted example, is the sequence of upcoming memory commands shown in the first row of the mapping table 305.

The sequence of upcoming memory commands corresponding to the indicated code (e.g., 0000) may indicate a sequence of upcoming memory commands to be received from the host device 110. In some implementations, the sequence of upcoming commands may be a fixed sequence. A fixed sequence may be a sequence of upcoming commands that includes a fixed, or static, number of commands. In such implementations, the memory device 120 may be able to determine a fixed number of commands to expect from the host device 110 for a given operation. Alternatively, the sequence of upcoming commands may include a variable number of commands. For example, when sending the pilot command, the host device 110 may not yet have determined how many write commands will be necessary to write certain data to the memory 140, and thus the sequence of upcoming commands may indicate that an unspecified (e.g., variable) number of write commands having certain attributes will be received from the host device 110 (e.g., the sequence of upcoming commands may indicate that the memory device will receive N write commands, or the like).

Additionally, or alternatively, the sequence of upcoming memory commands may include a fixed sequence of a fixed number of starting commands, followed by a variable number of commands, followed by a fixed sequence of a fixed number of ending commands. For example, the sequence of upcoming memory commands associated with the code 0001 in FIG. 3A includes a fixed sequence of a fixed number of starting commands (e.g., two starting commands), which, in this example, includes a command indicating a security type and a command indicating a number of blocks to be written. Following the fixed number of starting commands, the sequence of upcoming commands associated with the code 0001 includes a variable number of commands, which, in this example, is a variable number of write commands (e.g., the sequence of upcoming memory commands indicates memory commands 3 through N will be write commands, which may be associated with certain attributes or parameters). Following the variable number of the commands, the sequence of upcoming commands associated with the code 0001 includes a fixed sequence of a fixed number of ending commands (e.g., one ending command, which will be the N+1-th command received), which, in this example, is a command indicating the end of the write operation.

In this way, if the host device 110 is under malicious control or later becomes under malicious control and transmits one or more commands in an effort to thrash the memory device 120 error processing logic or otherwise render the memory device 120 unusable, the memory device 120 may determine that the commands originating from the malicious user are invalid because they do not align with sequence of upcoming memory commands. As a result, the memory device 120 may refrain from executing the command. This is described in more detail in connection with FIGS. 3B-3D.

Figure 3A:
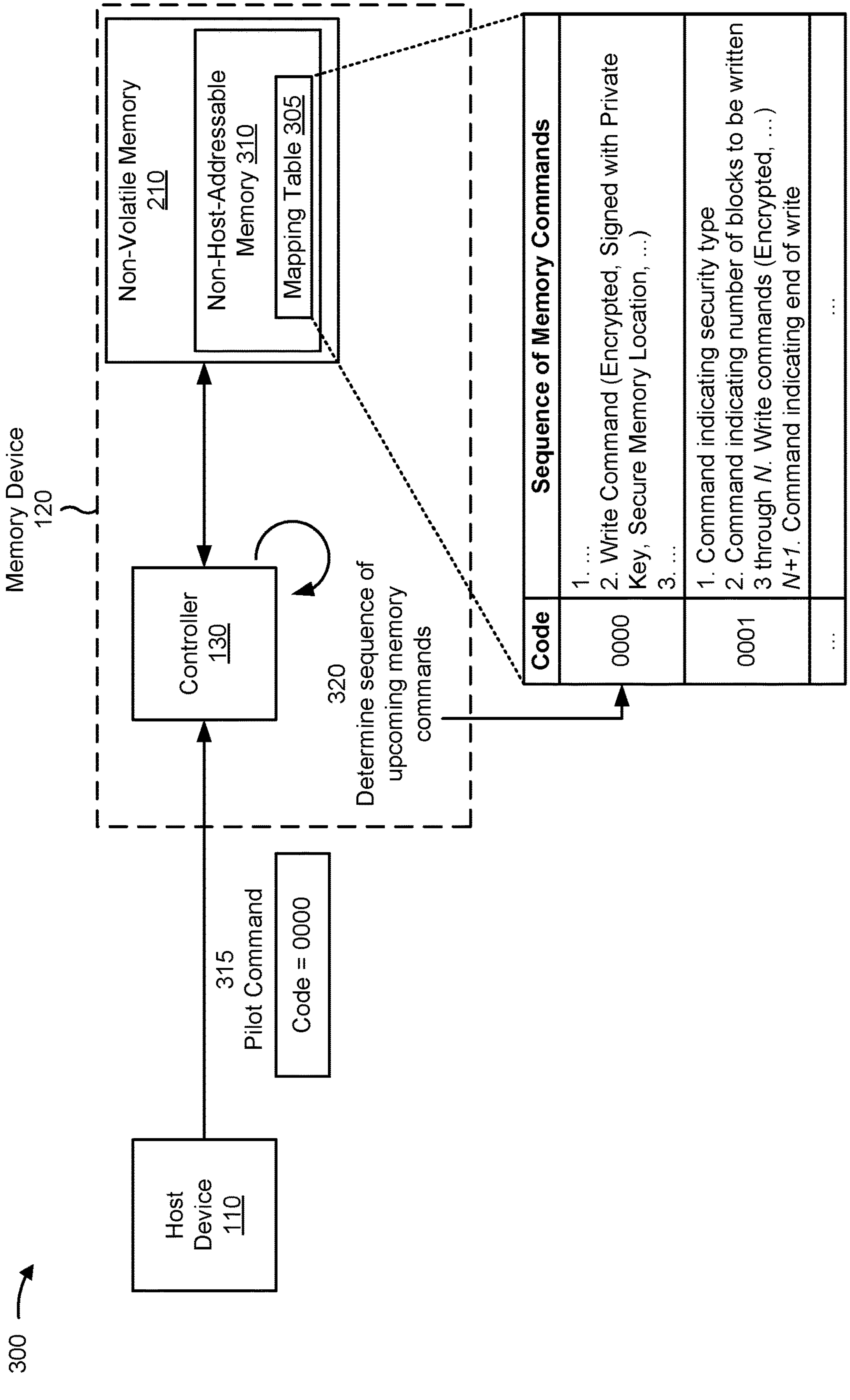
FIGS. 3A-3D are diagrams illustrating an example of protection against invalid memory commands.
Figure 3B:
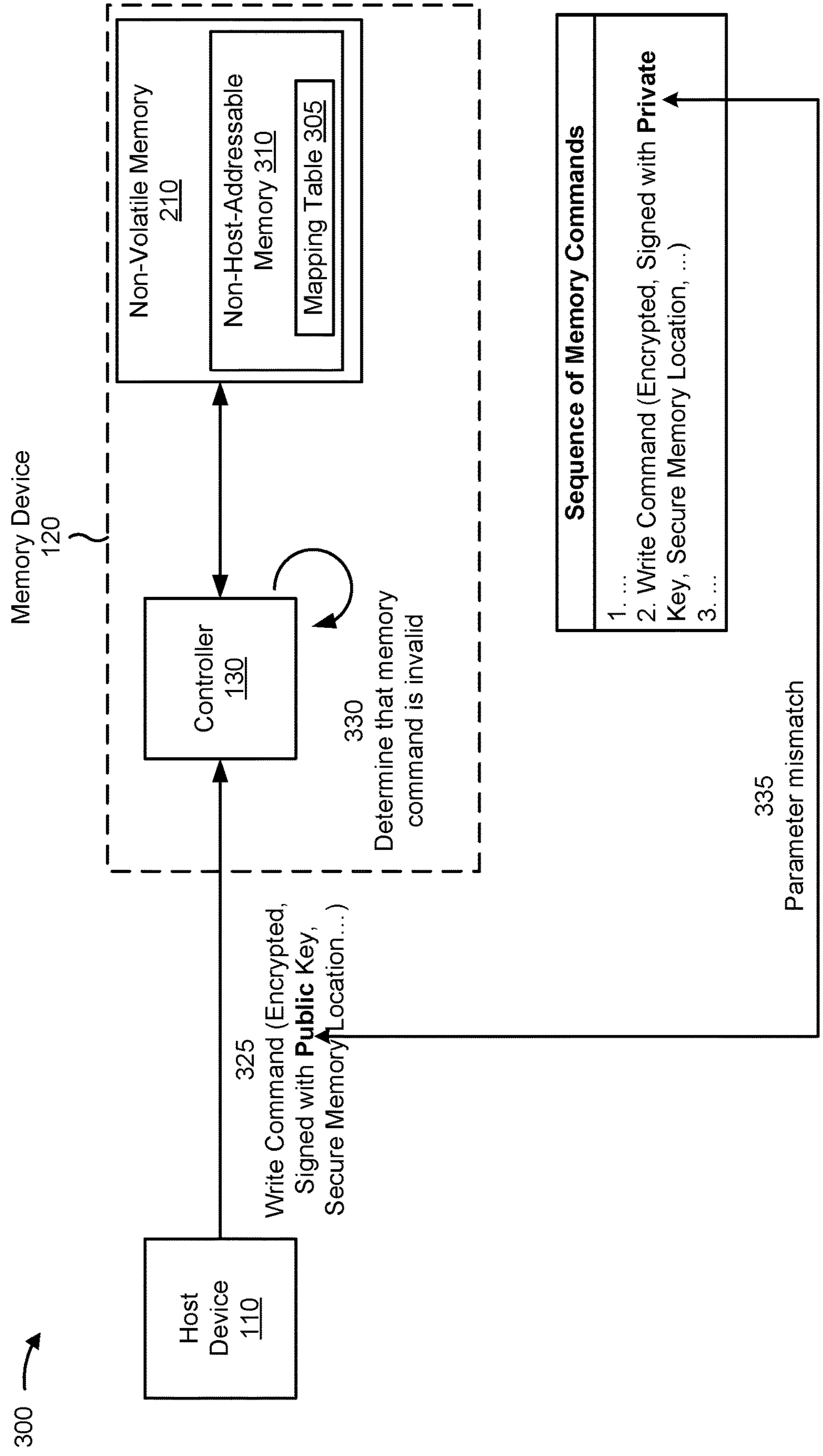

More particularly, and as shown in FIG. 3B, the memory device 120 may receive a memory command from the host device 110 after receiving the pilot command. For example, as shown by reference number 325, the memory device 120 may receive a write command from the host device 110. As described in connection with FIG. 3A, in some implementations, a write command may be associated with certain parameters, such as being encrypted, being signed with a public key, being associated with a secure memory location, or similar parameters. In some implementations, as shown by reference number 330, the memory device 120 may determine that the memory command is invalid based on the indication of the sequence of upcoming commands. For example, the one or more components of the memory device 120 may determine that the memory command is invalid because the memory command is a different type than is expected according to the indicated sequence of upcoming memory commands (e.g., the memory command is not a write command when a write command is expected). Put another way, the one or more components of the memory device 120 may determine that the memory command is invalid based on determining that a command type of the memory command does not match an expected command type of a next expected command in the sequence of upcoming memory commands (e.g., indicated in the mapping table 305), which is described in more detail below in connection with FIG. 4D.

Additionally, or alternatively, the memory device 120 may determine that the memory command is invalid because parameters of the memory command do not align with expected parameters according to the indicated sequence of upcoming memory commands. Put another way, the one or more components of the memory device 120 may determine that the memory command is invalid by determining that a command parameter associated with the memory command does not match an expected command parameter of a next expected command in the sequence of upcoming memory commands (e.g., indicated in the mapping table 305). The command parameter may be any parameter associated with a memory command, such as a command type of the memory command, whether the memory command is encrypted, whether the memory command is associated with encrypted data, whether the memory command is cryptographically signed, whether a public key or a private key is used to cryptographically sign the memory command, or a similar parameter.

For example, as shown in FIG. 3B, the sequence of upcoming memory commands indicates that the second command should be a write command, and that the write command should be encrypted, associated with a private key, and associated with a secure memory location. However, the write command received from the host device 110 (as shown by reference number 325), includes a write command that is encrypted and associated with a secure memory location (as expected), but that is not associated with a private key but rather is associated with a public key (which is not as expected). Accordingly, as shown by reference number 335, the one or more components of the memory device 120 may determine a mismatch between the parameters associated with the received write command and the parameters associated with the expected write command, and thus may determine that the write command indicated by reference number 325 is an invalid command. Alternatively, the one or more components of the memory device 120 may determine that the memory command is invalid based on determining that a command parameter associated with the memory command does not match any expected command parameters of any commands in the sequence of upcoming memory commands.

Figure 3C:
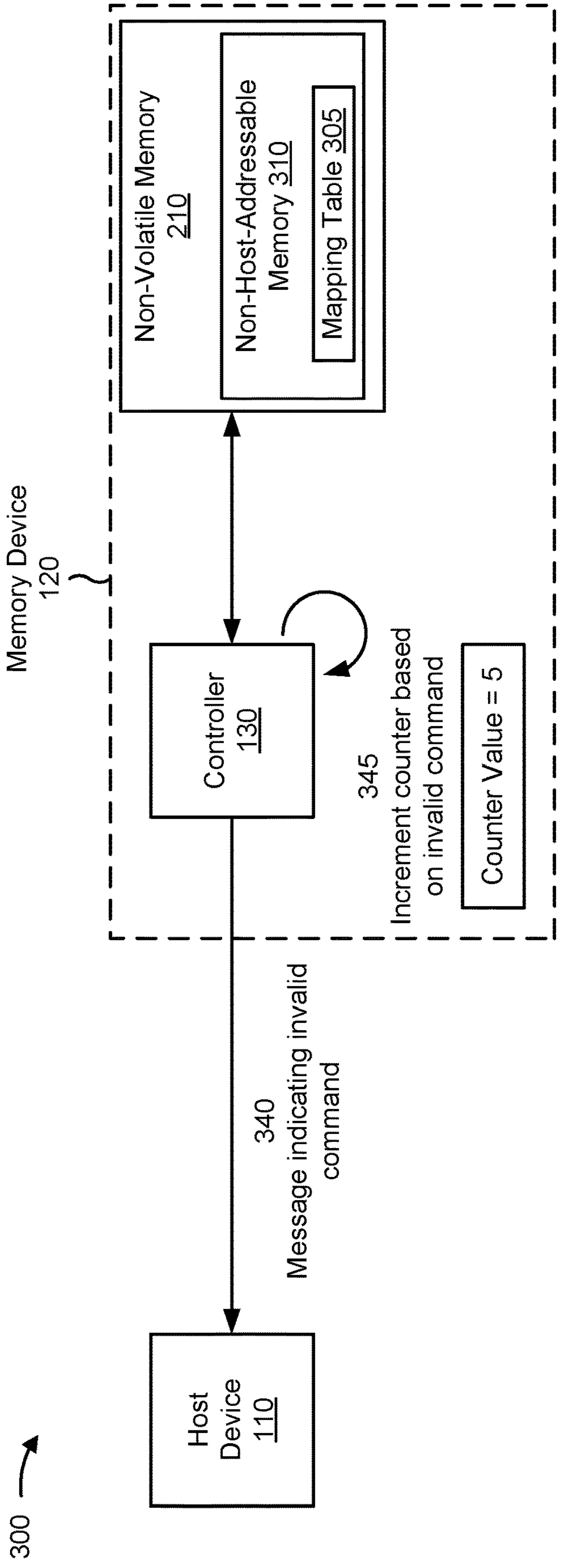

As shown in FIG. 3C, and as indicated by reference number 340, in some implementations, the memory device 120 may transmit, to the host device 110 and based on determining that the memory command is invalid, a message indicating that the memory command is invalid. For example, when the received command is not a type expected at that point in the operation as indicated by the sequence of upcoming memory commands, the memory device 120 may transmit an error message to the host device 110 that indicates "out of sequence command received," or the like. Alternatively, when the received command is not a type expected at all, or else is associated with unexpected parameters (e.g., the public key in the depicted example), the memory device 120 may transmit an error message to the host device 110 that indicates "illegal command received in transaction," or the like. In some implementations, the message shown by reference number 340 may exclude an indication of an expected command of the sequence of upcoming commands. In this way, if the host device 110 is under control by a malicious user, the malicious user will not receive an indication of the expected command or any information about what caused the invalid command to be reported by the memory device 120 (thereby giving the malicious user less information with which to thwart the security techniques described herein).

Moreover, in some implementations, the memory device may keep a running count of invalid commands received from the host device 110. In such implementations, and as shown by reference number 345, the memory device 120 may increment a counter, stored in the memory 140 of the memory device 120, based on determining that the memory command is invalid. In the example shown in FIG. 3C, up to the point shown the memory device 120 may have received five invalid commands, and thus the counter value may be incremented to a running total of five invalid commands.

Figure 3D:
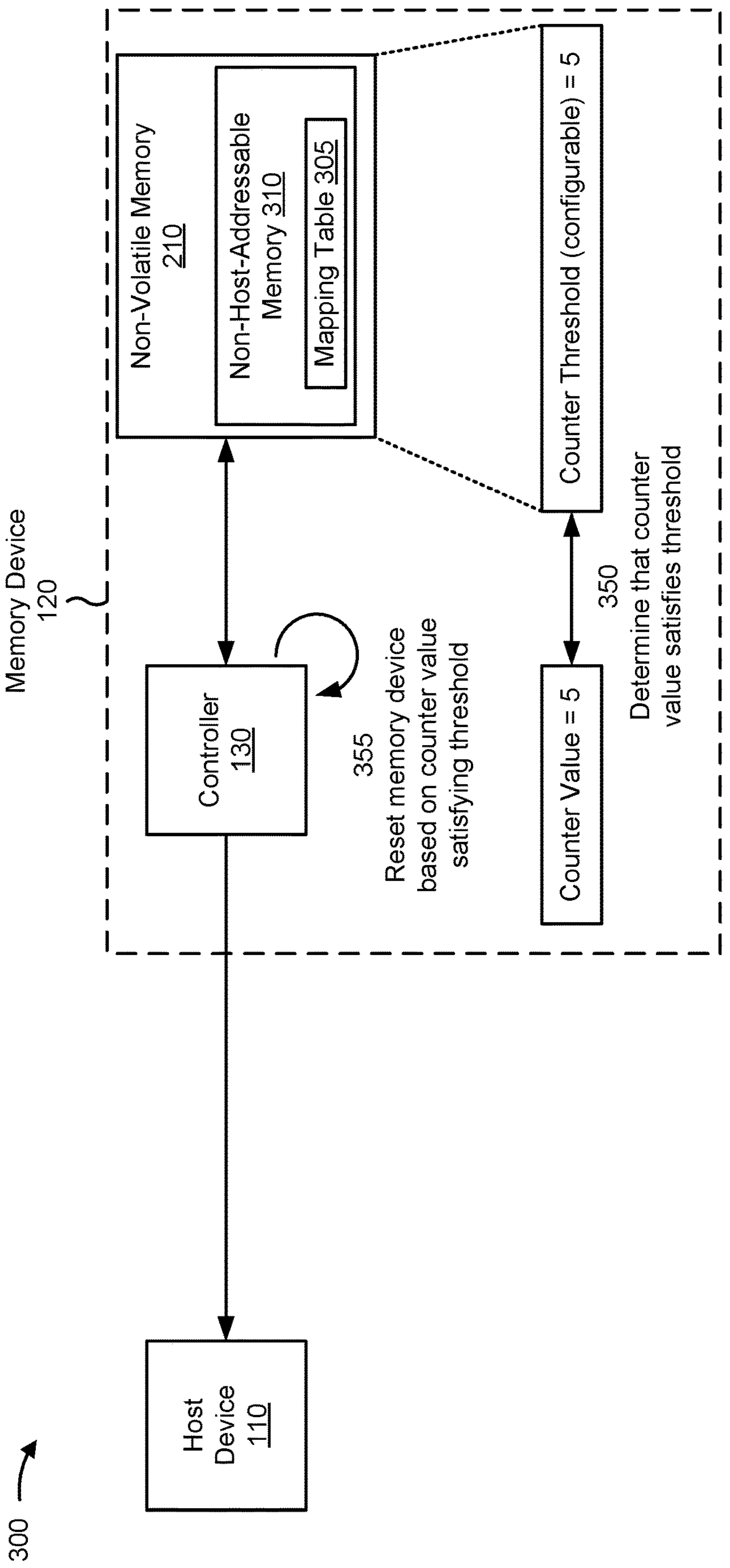

Moreover, in some implementations, the memory device 120 may be configured to reset the memory device 120 based on a value of the counter satisfying a threshold. More particularly, as shown in FIG. 3D, the memory 140 of the memory device 120 (e.g., one or more non-volatile memory arrays 210 of the memory device 120) may store a counter threshold. In some implementations, the counter threshold may be preconfigured and/or hard-coded, while in some other implementations, the counter threshold may be configurable and thus may be configured via a command received from the host device 110. In the depicted example, the counter threshold is equal to five. In some implementations, and as shown by reference number 350, the one or more components of the memory device 120 may determine that the counter value (which, in the depicted example, is five) satisfies the counter threshold (which, in the depicted example, is also five). Accordingly, and as shown by reference number 355, the one or more components of the memory device 120 may reset the memory device 120. In some implementations, resetting the memory device 120 may prevent the memory device 120 from locking up (e.g., becoming unresponsive to commands from the host device 110) and/or from having to enter a power-cycle mode in response to malicious thrashing, which may be undesirable for certain time-sensitive applications (e.g., autonomous driving application, aircraft applications, mission critical applications, or the like).

As indicated above, FIGS. 3A-3D are provided as examples. Other examples may differ from what is described with regard to FIGS. 3A-3D.

FIGS. 4A-4E are diagrams illustrating an example 400 of protection against invalid memory commands, in accordance with the present disclosure.

As shown by reference number 405, the memory device 120 may receive, from the host device 110 (e.g., via the host interface 150), a pilot command. As described in connection with reference number 315, the pilot command may include an indication of a sequence of upcoming memory commands to be transmitted from the host device 110 to the memory device 120, such an indication of a code that maps to the sequence of upcoming memory commands stored in the mapping table 305. In this example, the pilot command indicates a code of "0001."

As shown by reference number 410, and in a similar manner as described in connection with reference number 320, the memory device 120 may determine a sequence of upcoming memory commands based at least in part on the pilot command. In this example, the memory device 120 may retrieve and/or reference the sequence of upcoming memory commands associated with the "0001" code in the mapping table 305, which, in the depicted example, is the sequence of upcoming memory commands shown in the second row of the mapping table 305. As described, this sequence of upcoming memory commands includes a fixed sequence of a fixed number of starting commands (e.g., two commands including a first command indicating security type and a second command indicating a number of blocks to be written), followed by a variable number of commands (e.g., a variable number, shown as 3 through N, of write commands), followed by a fixed sequence of a fixed number of ending commands (e.g., one command, shown as N+1, indicating the end of the write process).

As shown in FIG. 4B, and as indicated by reference number 415, the memory device 120 may receive, from the host device 110, a first command. In this example, the first command is a command indicating a security type. As shown by reference number 420, the memory device 120 may determine that the memory command described in connection with reference number 415 is valid, and thus the memory device 120 may execute the memory command. More particularly, and as shown by reference number 425, the one or more components of the memory device 120 may determine that the received memory command (e.g., the command indicating the security type) and any associated parameters match an expected command and any associated parameters indicated by the sequence of upcoming memory commands (which, in this example, indicates that the first command to be received is a command indicating a security type).

As shown in FIG. 4C, and as indicated by reference number 430, the memory device 120 may then receive, from the host device 110, a second command. In this example, the second command is a command indicating a number of blocks to be written. As shown by reference number 435, the memory device 120 may determine that the memory command described in connection with reference number 430 is valid, and thus the memory device 120 may execute the memory command. More particularly, and as shown by reference number 440, the one or more components of the memory device 120 may determine that the second received memory command (e.g., the command indicating the number of blocks to be written) and any associated parameters match a second expected command and any associated parameters indicated by the sequence of upcoming memory commands (which, in this example, indicates that the second command to be received is a command indicating a number of blocks to be written).

As shown in FIG. 4D, and as indicated by reference number 445, the memory device 120 may receive, from the host device 110, a third command, which, in this example, is a read command. As shown by reference number 450, the memory device 120 may determine that the memory command described in connection with reference number 445 is invalid because the command does not match an expected command. More particularly, and as shown by reference number 455, the one or more components of the memory device 120 may determine that the third received memory command (e.g., the read command) and/or any associated parameters do not match a third expected command and any associated parameters indicated by the sequence of upcoming memory commands (which, in this example, indicates that the third command to be received is a write command, not a read command). Put another way, in this example, the one or more components of the memory device 120 may determine that a command type of the memory command does not match an expected command type of a next expected command in the sequence of upcoming memory commands (e.g., as indicated in the mapping table 305).

Accordingly, as shown in FIG. 4E, and as indicated by reference number 460, in some implementations, the memory device 120 may transmit, to the host device 110, a message indicating that the memory command is invalid (such as the message described in connection with reference number 340). For example, in this implementation, the memory device 120 may transmit an error message to the host device 110 that indicates "illegal command received in transaction," or the like, because the memory device 120 was not expecting a read command according to the sequence of upcoming memory commands. Moreover, and as shown by reference number 465, in some implementations, the memory device 120 may increment a counter, stored in the memory 140 of the memory device 120, based on determining that the memory command is invalid (such as the counter described in connection with reference number 345).

As indicated above, FIGS. 4A-4E are provided as examples. Other examples may differ from what is described with regard to FIGS. 4A-4E.

FIGS. 5A-5C are diagrams illustrating an example 500 of protection against invalid memory commands, in accordance with the present disclosure.

In some implementations, the memory device 120 may enable a memory command validation mode in order to perform one or more operations associated with validating memory commands, such as one or more of the operations described above in connection with FIGS. 3A-4E. More particularly, as shown in FIG. 5A, and with respect to reference number 505, the memory device 120 may receive, from the host device 110, a pilot command that includes a code that maps to a sequence of upcoming memory commands (e.g., the pilot command may include an indication of a sequence of upcoming memory commands to be transmitted from the host device 110 to the memory device 120). For example, the memory device 120 may receive one of the pilot commands described in connection with reference numbers 315 and 405, or a similar pilot command. In this implementation, and as shown by reference number 510, the memory device 120 may enable a memory command validation mode based on receiving the pilot command. Put another way, the pilot command may be configured to cause the memory device 120 to enter the memory command validation mode to validate memory commands using the sequence of upcoming memory commands.

In some implementations, the memory command validation mode may be a mode in which the memory device 120 validate incoming commands by referencing a sequence of upcoming memory commands stored in the mapping table 305 and associated with the code included in the pilot command, as described above in connection with FIGS. 3A-4E. In that regard, and as shown by reference number 510, one or more components of the memory device 120 may determine a sequence of upcoming memory commands, as described above in connection with reference numbers 320 and 410.

Moreover, in some implementations, the memory device 120 may transmit, to the host device 110, an acknowledgement that the memory command validation mode has been enabled. In such implementations, the host device 110 may be configured to transmit the memory command to the memory device 120 after receiving the acknowledgement, from the memory device 120, that the memory command validation mode has been enabled for the memory device 120. Alternatively, based on receiving the acknowledgement or otherwise, the host device 110 may determine that the pilot command was erroneously transmitted to the memory device 120. In such implementations, the host device 110 may transmit, to the memory device 120, an instruction to exit the memory command validation mode based on determining that the pilot command was erroneously transmitted to the memory device 120. The memory device 120 may exit the memory command validation mode based on receiving such an instruction.

As shown in FIG. 5B, and as indicated by reference number 515, the memory device 120 may receive, from the host device 110 and while the memory command validation mode is enabled, a memory command. That is, the host device 110 may transmit a memory command to the memory device 120 after transmitting the pilot command. For example, the memory device 120 may receive a write command (such as the command described in connection with reference number 325), a command indicating a security type (such as the command described in connection with reference number 415), a command indicating a number of blocks to be written (such as the command described in connection with reference number 430), a read command (such as the command described in connection with reference number 445), or a similar memory command. Moreover, one or more components of the memory device (e.g., the controller 130 and/or the security component 270 thereof) may determine whether the memory command is valid based on the sequence of upcoming memory commands, in a similar manner as described in connection with reference numbers 330, 420, 435, and 450.

As shown by reference number 520, the memory device 120 may selectively execute or ignore the memory command based on determining whether the memory command is valid. For example, the memory device 120 may execute the memory command if the memory command is valid, as described in connection with reference numbers 420 and 435. Alternatively, the memory device 120 may ignore the memory command if the memory command is invalid, as described in connection with reference numbers 330 and 450. Moreover, in some implementations, the memory device 120 may transmit, to the host device 110, a message indicating that the memory command is invalid based on determining that the memory command is invalid. Put another way, the host device 110 may receive, from the memory device 120, a message indicating that the memory command is invalid in association with the pilot command. For example, the memory device 120 may transmit, to the host device 110, a similar message to the messages described in connection with reference numbers 340 and 460. In that regard, and as described in connection with reference number 340, in some implementations, the message excludes an indication of an expected command of the sequence of upcoming memory commands.

In some implementations, the memory device 120 may exit the memory command validation mode based on an instruction received from the host device 110, based on the memory device 120 receiving all expected memory commands indicated by a sequence of upcoming commands, or the like. For example, as shown in FIG. 5C, and as indicated by reference number 525, the host device 110 may determine that a previously transmitted pilot command was transmitted in error, that a previously transmitted pilot command contained erroneous information, or the like. In response, the host device 110 may transmit, to the memory device 120, an instruction to exit the memory command validation mode. For example, as shown by reference number 530, the memory device 120 may receive, from the host device 110, an instruction to exit the memory command validation mode. Accordingly, as shown by reference number 535, the memory device 120 may exit the memory command validation mode based on the instruction. The host device 110 may transmit such an instruction in order to commence a new memory command validation session (e.g., in order to send a new and/or correct pilot command that triggers a new session) and/or to initiate other evasive action at the host device 110 and/or the memory device 120 in order to protect against the memory device 120 from the malicious activity.

Alternatively, the host device 110 may transmit, to the memory device 120, an instruction to reset the memory command validation mode (e.g., reset the operation context or the transaction context). For example, due to a communication error, an interrupted memory operation, or the like, the host device 110 may need to restart the sequence of commands indicated by the sequence of upcoming memory commands, and thus may transmit an indication to reset the memory command validation mode, which may trigger the memory device 120 to begin validating memory commands anew (e.g., beginning with the first indicated memory command of the sequence of upcoming memory commands).

Moreover, in some implementations, the command to exit or terminate the memory command validation mode may be an authenticated secure command. That is, the command to exit or terminate the memory command validation mode may be a command that is executed within an envelope of a security protocol established between the host device 110 and the memory device 120. Moreover, in some implementations, the instruction to exit or terminate the memory command validation mode may be associated with an authenticated session exit command or an authenticated session termination command. In some implementations, an authenticated session exit command may be an abrupt command to immediately cease the memory command validation mode with certain internal cleanup procedures at the memory device 120. An authenticated session termination command may be less abrupt and may result in a more prolonged and systemic tear down of an operation or transaction context. The command to exit or terminate the memory command validation mode may beneficially end an erroneously initiated memory command validation mode (e.g., when the host device 110 erroneously sends a pilot command) so that the host device 110 may thereafter transmit memory commands outside of an indicated sequence of upcoming memory commands without the memory device 120 rejecting the memory commands.

Alternatively, when no malicious activity is detected, the memory device 120 may exit the memory command validation mode after receiving all memory commands indicated by the sequence of upcoming memory commands, or the like. Put another way, in some implementations, the memory device 120 may exit the memory command validation mode based on a determination that a memory command received from the host device (e.g., the memory command described in connection with reference number 515) is a final command included in the sequence of upcoming memory commands. Automatically terminating a memory command validation mode after all memory commands indicated by the sequence of upcoming memory commands have been transmitted may reduce a number of messages or other signaling needed to be transmitted between the host device 110 and the memory device 120.

As indicated above, FIGS. 5A-5C are provided as examples. Other examples may differ from what is described with regard to FIGS. 5A-5C.

FIG. 6 is a flowchart of an example method 600 associated with protection against invalid memory commands. In some implementations, a memory device (e.g., memory device 120) may perform or may be configured to perform one or more process blocks of FIG. 6. Additionally, or alternatively, one or more components of the memory device (e.g., controller 130 and/or security component 270 thereof) may perform or may be configured to perform one or more process blocks of FIG. 6.

As shown in FIG. 6, the method 600 may include receiving, from a host device (e.g., host device 110), a pilot command that includes an indication of a sequence of upcoming memory commands to be transmitted from the host device to the memory device (block 610). As further shown in FIG. 6, the method 600 may include receiving a memory command from the host device after receiving the pilot command (block 620). As further shown in FIG. 6, the method 600 may include determining that the memory command is invalid based on the indication of the sequence of upcoming memory commands (block 630). As further shown in FIG. 6, the method 600 may include transmitting, to the host device and based on determining that the memory command is invalid, a message indicating that the memory command is invalid (block 640).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 3A-5C.

FIG. 7 is a flowchart of an example method 700 associated with protection against invalid memory commands. In some implementations, a memory device (e.g., memory device 120) may perform or may be configured to perform one or more process blocks of FIG. 7. Additionally, or alternatively, one or more components of the memory device (e.g., controller 130 and/or security component 270 thereof) may perform or may be configured to perform one or more process blocks of FIG. 7.

As shown in FIG. 7, the method 700 may include receiving, from a host device (e.g., host device 110), a pilot command that includes a code that maps to a sequence of upcoming memory commands (block 710). As further shown in FIG. 7, the method 700 may include enabling a memory command validation mode based on receiving the pilot command (block 720). As further shown in FIG. 7, the method 700 may include receiving, from the host device and while the memory command validation mode is enabled, a memory command (block 730). As further shown in FIG. 7, the method 700 may include determining whether the memory command is valid based on the sequence of upcoming memory commands (block 740). As further shown in FIG. 7, the method 700 may include selectively executing or ignoring the memory command based on determining whether the memory command is valid, wherein the memory command is executed if the memory command is valid, and wherein the memory command is ignored if the memory command is invalid (block 750).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 3A-5C.

FIG. 8 is a flowchart of an example method 800 associated with protection against invalid memory commands. In some implementations, a system (e.g., system 100) may perform or may be configured to perform one or more process blocks of FIG. 8. In some implementations, another device or a group of devices separate from or including the system (e.g., host device 110 and/or memory device 120) may perform or may be configured to perform one or more process blocks of FIG. 8. Additionally, or alternatively, one or more components of the system (e.g., controller 130 and/or security component 270 thereof) may perform or may be configured to perform one or more process blocks of FIG. 8.

As shown in FIG. 8, the method 800 may include transmitting, to a memory device (e.g., memory device 120), a pilot command that includes an indication of a sequence of upcoming memory commands to be transmitted from the host device to the memory device, wherein the pilot command is configured to cause the memory device to enter a memory command validation mode to validate memory commands using the sequence of upcoming memory commands (block 810). As further shown in FIG. 8, the method 800 may include transmitting a memory command to the memory device after transmitting the pilot command (block 820). As further shown in FIG. 8, the method 800 may include receiving, from the memory device, a message indicating that the memory command is invalid in association with the pilot command (block 830).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 3A-5C.

In some implementations, a memory device includes one or more components configured to: receive, from a host device, a pilot command that includes an indication of a sequence of upcoming memory commands to be transmitted from the host device to the memory device; receive a memory command from the host device after receiving the pilot command; determine that the memory command is invalid based on the indication of the sequence of upcoming memory commands; and transmit, to the host device and based on determining that the memory command is invalid, a message indicating that the memory command is invalid.

In some implementations, a method performed by a memory device includes receiving, from a host device, a pilot command that includes a code that maps to a sequence of upcoming memory commands; enabling a memory command validation mode based on receiving the pilot command; receiving, from the host device and while the memory command validation mode is enabled, a memory command; determining whether the memory command is valid based on the sequence of upcoming memory commands; and selectively executing or ignoring the memory command based on determining whether the memory command is valid, wherein the memory command is executed if the memory command is valid, and wherein the memory command is ignored if the memory command is invalid.

In some implementations, a system includes a host device configured to: transmit, to a memory device, a pilot command that includes an indication of a sequence of upcoming memory commands to be transmitted from the host device to the memory device, wherein the pilot command is configured to cause the memory device to enter a memory command validation mode to validate memory commands using the sequence of upcoming memory commands; transmit a memory command to the memory device after transmitting the pilot command; and receive, from the memory device, a message indicating that the memory command is invalid in association with the pilot command.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:

one or more components configured to:

receive, from a host device, a pilot command that includes an indication of a sequence of upcoming memory commands comprising a preconfigured order of upcoming memory commands;

receive a memory command from the host device after receiving the pilot command;

determine that the memory command is invalid based on determination of whether a command parameter associated with the memory command does not match an expected command parameter of a next expected command in the sequence of upcoming memory commands, wherein the command parameter includes at least one of:

whether the memory command is encrypted, whether the memory command is associated with encrypted data, whether the memory command is cryptographically signed, or whether a public key or a private key is used to cryptographically sign the memory command;

increment a counter based on determining that the memory command is invalid in association with the sequence of upcoming memory commands; and reset the memory device automatically in response to determining, at the memory device, that a value of the counter satisfies a threshold.

2. The memory device of claim 1, wherein the indication, included in the pilot command received from the host device, includes a code that maps to the sequence of upcoming memory commands to be transmitted from the host device to the memory device.

3. The memory device of claim 1, further comprising a memory configured to store a table that indicates mappings between codes and corresponding sequences of upcoming memory commands.

4. The memory device of claim 3, wherein the memory device is configured to store the table in a non-host-addressable memory region.

5. The memory device of claim 1, wherein the command parameter further includes a command type of the memory command.

6. The memory device of claim 1, wherein the one or more components, to determine that the memory command is invalid, are configured to:

determine that the command parameter associated with the memory command does not match any expected command parameters of any commands in the sequence of upcoming memory commands.

7. The memory device of claim 1, wherein the one or more components, to determine that the memory command is invalid, are configured to:

determine that a command type of the memory command does not match an expected command type of a next expected command in the sequence of upcoming memory commands.

8. The memory device of claim 1, wherein the one or more components are further configured to:

transmit, to the host device, a message indicating that the memory command is invalid, wherein the message excludes an indication of an expected command of the sequence of upcoming memory commands.

9. A memory device, comprising:

one or more components configured to:

receive, from a host device, a pilot command that includes an indication of a sequence of upcoming memory commands comprising a preconfigured order of upcoming memory commands to be transmitted from the host device to the memory device;

receive a memory command from the host device after receiving the pilot command;

determine that the memory command is invalid based on determination of whether a command parameter associated with the memory command does not match an expected command parameter of a next expected command in the sequence of upcoming memory commands, wherein the command parameter includes at least one of:

whether the memory command is encrypted, whether the memory command is associated with encrypted data, whether the memory command is cryptographically signed, or whether a public key or a private key is used to cryptographically sign the memory command;

increment a counter, stored in memory of the memory device, based on determining that the memory command is invalid;

transmit, to the host device and based on determining that the memory command is invalid, a message indicating that the memory command is invalid; and reset the memory device automatically in response to determining, at the memory device, that a value of the counter satisfies a threshold.

10. The memory device of claim 9, wherein the indication, included in the pilot command received from the host device, includes a code that maps to the sequence of upcoming memory commands to be transmitted from the host device to the memory device.

11. The memory device of claim 9, further comprising a memory configured to store a table that indicates mappings between codes and corresponding sequences of upcoming memory commands.

12. A method performed by a memory device, comprising:

receiving, from a host device, a pilot command that includes a code that maps to a sequence of upcoming memory commands, the sequence of upcoming memory commands comprising a preconfigured order of upcoming commands to be transmitted from the host device to the memory device;

enabling a memory command validation mode based on receiving the pilot command;

receiving, from the host device and while the memory command validation mode is enabled, a memory command;

determining whether the memory command is valid based on determining whether a command parameter associated with the memory command does not match an expected command parameter of a next expected command in the sequence of upcoming memory commands, wherein the command parameter includes at least one of:

whether the memory command is encrypted, whether the memory command is associated with encrypted data, whether the memory command is cryptographically signed, or whether a public key or a private key is used to cryptographically sign the memory command;

selectively executing or ignoring the memory command based on determining whether the memory command is valid, wherein the memory command is executed if the memory command is valid, and wherein the memory command is ignored if the memory command is invalid; and determining, at the memory device, whether to reset the memory device automatically in response to determining whether a value of a counter, associated with invalid memory commands, satisfies a threshold.

13. The method of claim 12, further comprising transmitting, to the host device, a message indicating that the memory command is invalid based on determining that the memory command is invalid.

14. The method of claim 12, wherein the sequence of upcoming memory commands is a fixed sequence.

15. The method of claim 12, wherein the sequence of upcoming memory commands includes a variable number of commands.

16. The method of claim 12, wherein the sequence of upcoming memory commands includes a fixed sequence of a fixed number of starting commands, followed by a variable number of commands, followed by a fixed sequence of a fixed number of ending commands.

17. The method of claim 12, wherein the sequence of upcoming memory commands is associated with a read operation, a write operation, or a memory management operation.

18. The method of claim 12, further comprising exiting the memory command validation mode based on a determination that the memory command is a final command included in the sequence of upcoming memory commands.

19. The method of claim 12, further comprising:

receiving an instruction to exit the memory command validation mode; and exiting the memory command validation mode based on the instruction.

20. A system, comprising:

a host device configured to:

transmit, to a memory device, a pilot command that includes an indication of a sequence of upcoming memory commands to be transmitted from the host device to the memory device, the sequence of upcoming memory commands comprising a preconfigured order of upcoming commands to be transmitted from the host device to the memory device, wherein the pilot command is configured to cause the memory device to enter a memory command validation mode to validate memory commands using the preconfigured order of upcoming memory commands;

transmit a memory command to the memory device after transmitting the pilot command; and receive, from the memory device, a message indicating that the memory command is invalid in association with the pilot command; and the memory device configured to:

determine that the memory command is invalid based on determination of whether a command parameter associated with the memory command does not match an expected command parameter of a next expected command in the sequence of upcoming memory commands, wherein the command parameter includes at least one of:

whether the memory command is encrypted,
whether the memory command is associated with encrypted data,
whether the memory command is cryptographically signed, or
whether a public key or a private key is used to cryptographically sign the memory command;

increment a counter based on determining that the memory command is invalid in association with the sequence of upcoming memory commands; and reset the memory device automatically in response to determining, at the memory device, that a value of the counter satisfies a threshold.

21. The system of claim 20, wherein the host device is configured to transmit the memory command to the memory device after receiving an acknowledgement, from the memory device, that the memory command validation mode has been enabled for the memory device.

22. The system of claim 20, wherein the host device is further configured to:

determine that the pilot command was erroneously transmitted to the memory device; and transmit, to the memory device, an instruction to exit the memory command validation mode based on determining that the pilot command was erroneously transmitted to the memory device.

23. The system of claim 20, wherein the sequence of upcoming memory commands indicates the command parameter associated with the memory command.

24. The system of claim 23, wherein the command parameter further includes a command type of the memory command.

25. The system of claim 20, wherein the message excludes an indication of an expected command of the sequence of upcoming memory commands.

* * * * *